US010328737B2

(12) United States Patent
Lok et al.

(10) Patent No.: US 10,328,737 B2
(45) Date of Patent: Jun. 25, 2019

(54) HIGH REFRACTIVE INDEX COATINGS AND THEIR USE IN THE PROTECTION OF SURFACE RELIEF STRUCTURES

(75) Inventors: Phei Lok, Craigieburn (AU); Gary Fairless Power, Craigieburn (AU); Odisea Batistatos, Craigieburn (AU)

(73) Assignee: CCL Secure Pty Ltd, Craigieburn, Victoria (AU)

( * ) Notice: Subject to any disclaimer, the term of this patent is extended or adjusted under 35 U.S.C. 154(b) by 320 days.

(21) Appl. No.: 13/637,079

(22) PCT Filed: Mar. 23, 2011

(86) PCT No.: PCT/AU2011/000327
§ 371 (c)(1),
(2), (4) Date: Dec. 27, 2012

(87) PCT Pub. No.: WO2011/116419
PCT Pub. Date: Sep. 29, 2011

(65) Prior Publication Data
US 2013/0093176 A1    Apr. 18, 2013

(30) Foreign Application Priority Data

Mar. 25, 2010 (AU) ................... 2010901324

(51) Int. Cl.
| | | |
|---|---|---|
| *B42D 25/324* | (2014.01) | |
| *C09D 7/61* | (2018.01) | |
| *C09D 7/40* | (2018.01) | |
| *G02B 1/14* | (2015.01) | |
| *B42D 25/373* | (2014.01) | |
| *B82Y 30/00* | (2011.01) | |
| *C08K 3/22* | (2006.01) | |
| *C09D 11/033* | (2014.01) | |
| *C09D 11/037* | (2014.01) | |
| *B32B 33/00* | (2006.01) | |
| *B42D 15/00* | (2006.01) | |
| *B42D 25/29* | (2014.01) | |
| *G02B 1/10* | (2015.01) | |
| *B42D 25/328* | (2014.01) | |

(52) U.S. Cl.
CPC ............ *B42D 25/324* (2014.10); *B32B 33/00* (2013.01); *B42D 15/00* (2013.01); *B42D 25/29* (2014.10); *B42D 25/373* (2014.10); *B82Y 30/00* (2013.01); *C08K 3/22* (2013.01); *C09D 7/61* (2018.01); *C09D 7/67* (2018.01); *C09D 11/033* (2013.01); *C09D 11/037* (2013.01); *G02B 1/14* (2015.01); *B42D 25/328* (2014.10); *B42D 2033/18* (2013.01); *B42D 2033/20* (2013.01); *G02B 1/105* (2013.01); *Y10T 428/256* (2015.01)

(58) Field of Classification Search
CPC ........ B42D 15/00; B42D 15/10; B42D 25/00; B42D 25/30; B42D 25/45; B42D 25/29; B42D 25/328; B42D 2033/20; B42D 2033/18; C09D 7/1216; C09D 11/037; C09D 11/033; C09D 7/1266; B32B 33/00; Y10T 428/256; C08K 3/22; G02B 1/105; B82Y 30/00
USPC ................. 283/72, 74, 82, 94, 95, 109, 901
See application file for complete search history.

(56) References Cited

U.S. PATENT DOCUMENTS

| | | | |
|---|---|---|---|
| 2,129,362 A * | 9/1938 | Simons | ................... D21H 21/46 283/67 |
| 5,944,356 A * | 8/1999 | Bergmann | ........... G06K 19/083 283/109 |
| 5,981,040 A | 11/1999 | Rich et al. | |
| 6,468,380 B1 | 10/2002 | Christuk et al. | |
| 7,454,103 B2 | 11/2008 | Parriaux | |
| 2003/0127847 A1* | 7/2003 | Keller | ..................... B42D 25/00 283/109 |
| 2007/0085334 A1 | 4/2007 | Watanabe et al. | |
| 2007/0221939 A1 | 9/2007 | Taskar et al. | |
| 2008/0081181 A1* | 4/2008 | Hildenbrand | ............... C08J 7/18 428/333 |
| 2008/0191463 A1* | 8/2008 | Vermeulen | ......... G02B 27/2214 283/110 |
| 2008/0224462 A1* | 9/2008 | Dubner | ................... B32B 27/36 283/75 |
| 2008/0258457 A1* | 10/2008 | Commander | ........... B29C 33/68 283/107 |
| 2009/0121473 A1* | 5/2009 | Camus | ................. B42D 25/324 283/85 |

(Continued)

FOREIGN PATENT DOCUMENTS

| | | | |
|---|---|---|---|
| EP | 1303795 B1 | 4/2003 | |
| EP | 2042343 A1 | 4/2009 | |

(Continued)

OTHER PUBLICATIONS

Hanna, A Synthetfc Resin Which Has Unusual Properties, 535,827. 1, 1949 pp. 25-30.
Cerao Incorporated, Zirconium Oxide, ZrO2 For Optical Coating, 2007.
Material Safety Data Sheet, Identification of The Substance/Preparation and of The Company,/Undertaking Hombitec RM 303 LP. Apr. 28, 2009, pp. 1-4.

(Continued)

*Primary Examiner* — Justin V Lewis
(74) *Attorney, Agent, or Firm* — Christopher M. Scherer; DeWitt LLP

(57) ABSTRACT

High refractive index coatings having metal oxide particles are disclosed. Dispersions of metal oxide particles in solvent are also disclosed. These find use in the protection of surface relief structures. In some disclosed embodiments, the coatings or dispersions contain UV-curable resins. The coatings and dispersions find application in the field of security devices and documents and tokens incorporating security devices.

11 Claims, No Drawings

(56) References Cited

U.S. PATENT DOCUMENTS

| | | | | |
|---|---|---|---|---|
| 2009/0256347 | A1* | 10/2009 | Uhlemayr | C09J 7/041 283/72 |
| 2010/0109317 | A1* | 5/2010 | Hoffmuller | B41M 3/14 283/91 |
| 2010/0276919 | A1* | 11/2010 | Dietemann | B29C 55/005 283/74 |

FOREIGN PATENT DOCUMENTS

| | | | | |
|---|---|---|---|---|
| WO | 0164434 | A1 | | 9/2001 |
| WO | WO 2008031170 | A1 * | | 3/2008 |
| WO | 2008051814 | A1 | | 5/2008 |
| WO | WO 2008098753 | A1 * | 8/2008 | B41M 3/14 |
| WO | WO 2009083690 | A2 * | 7/2009 | B29C 55/005 |

OTHER PUBLICATIONS

Material Safety Data Sheet, Identification of The Substance/Preperation and of The Company,/Undertaking Hombitec RM. Nov. 11, 2009, pp. 1, 4 and 5.
Material Safety Data, Identification of The Substance/Preparation and of The Company,/Undertaking Hombitec RM 303 LP, 2009, pp. 1-4. Material Safety Data, Identification of The Substance/Preparation and of The Company,/Undertaking Hombitec RM 303 LP, 2009, pp. 1-4.
Product Information Hombitec Pastes, Great Solutions with Small Particles, Schtuben, 2009.
Nano Gram Corporation, Nanogram TiO2, 2008.
HOMBITEC—The Inorganic UV-Absorber For Long-Term Protection, Great Solutions With Small Particles, Schtleben, 2009.
Wang et al., Hybrid High Refractive Index Polymer Coatings, Brewer Sciences, Inc., 2005.
Flaim et al., High Refractive Index Polymer Coatings For Optoelectronics Applications, Brewer Sciences, Inc., 2003.
Search Report for International Patent Application No. PCT/AU2011/000327; dated Jun. 10, 2011.

\* cited by examiner

HIGH REFRACTIVE INDEX COATINGS AND THEIR USE IN THE PROTECTION OF SURFACE RELIEF STRUCTURES

PRIORITY CLAIM

This patent application is a U.S. National Phase of International Patent Application No. PCT/AU2011/000327, filed 23 Mar. 2011, which claims priority to Australian Patent Application No. 2010901324, filed 25 Mar. 2010, the disclosures of which are incorporated herein by reference in their entirety.

FIELD

The disclosed embodiments relate to high refractive index coatings comprising metal oxide particles, to methods of their manufacture and to their use in the protection of surface relief structures. The disclosed embodiments are particularly, but not exclusively, applicable to the field of security devices and documents and tokens incorporating security devices.

BACKGROUND

Relief structures, such as printed or stamped diffractive optical surface structures and similar security features, are exposed to counterfeiting by mechanical lifting when the structure is not coated and therefore exposed. The coating required to protect such structures must be of a sufficiently high refractive index compared to the substrate to which the feature is applied to maintain visibility of the feature. Such high refractive index (HRI) coatings, used for relief structures applied to a variety of substrates, should preserve all or as much of the original, intended colour, clarity and visibility of the non-coated feature as possible. Therefore, high transparency and low (or no) colour are important requirements if a diffractive effect, which is visible both in reflection and transmission, is to be achieved, especially for relief structures applied to clear substrates. To date, these requirements have been difficult to fulfil by a printed coating where good adhesion, chemical resistance and high durability are required, whilst also rendering the relief structure resistant to mechanical lifting.

Traditionally, HRI coatings based on titanium dioxide (titania) or zinc sulfide or zinc selenide have been deposited onto a surface by vacuum deposition, a technique which requires high temperatures and is expensive. Other sputtering techniques of metal layer deposition may not be easily adapted to high speed printing. Furthermore, some surface structures require a layer of high refractive index coating that is of the order of microns thick. Metallized coatings are unsuitable, as thicker coatings are expensive and can impart a highly reflective surface with noticeable color in the coating. Thicker metalized coatings are also less robust. High refractive index coatings made of metal- containing polymer are known, but utilization requires coating and subsequent curing at high temperature to provide a metallic coating on the substrate (Wang et al, Proceedings of SPIE, vol. 5724, 2005). This technique requires a processing temperature exceeding 100° C. and often up to 200° C., which is too high for use with a polymer substrate, and is not amenable to reel-to-reel printing processes.

Metal dioxide particles of various sizes employed in suspension or other liquid formulations are known in HRI coating technology mainly for application in electronic displays. Clarity of the coating can be improved by reducing the coat weight. However this can reduce the effectiveness of protecting the structure on certain relief structures. Metal dioxide nanopowders, in which the particles are coated with various functional groups, may be dispersed in a suitable solvent and utilized as a coating formulation. However, these materials can suffer from poor adhesion to polymer substrates in the absence of suitable additives.

The conventional method of utilizing high refractive metal oxides is as an additive, mixed with a resin or carrier. This may improve adhesion; however, it also leads to a reduction in refractive index, depending on the ratio of metal oxide to resin employed. On embossed substrates, such formulations based on titanium dioxide alone yield coatings with very poor adhesion and low transparency. Adhesion can be improved by increasing the amount of resin, but refractive index is then reduced.

Whilst high refractive index polymers containing halogens are available, they are undesirable from cost and environmental standpoints.

There is therefore a need for a high refractive index coating that provides a durable coating which is resistant to mechanical lifting, transparent, of high adhesion, whilst at the same time being simple to employ.

SUMMARY

At least one disclosed embodiment provides a coating for use in the protection of a surface relief structure, the coating having a refractive index greater than the refractive index of the surface relief structure, the coating comprising particles of at least one metal oxide. In some disclosed embodiments, the coating may additionally comprise at least one transparent varnish. By varnish it is meant a material that results in a durable protective finish on and/or within the coating. It has been advantageously found that when the coating is applied to a substrate and the solvent removed, the presence of a transparent varnish provides enhanced adhesion of the coating to the substrate. Use of a transparent varnish also improves transparency of the coating. Surprisingly, it has been found that, in cases where the coating has a slight colouration, the use of a transparent varnish reduces this colour. Exemplary transparent varnishes are, but are not limited to, nitrocellulose and cellulose acetyl butyrate.

Examples of surface relief structures include, but are not limited to, printed or stamped surface relief structures.

DETAILED DESCRIPTION OF THE DISCLOSED EMBODIMENTS

At least one disclosed embodiment provides a coating for use in the protection of a surface relief structure, the coating forming all or part of the surface relief structure, the coating comprising particles of at least one metal oxide.

Yet another disclosed embodiment provides a dispersion comprising particles of one or more metal oxides, at least one organic solvent and at least one transparent varnish. In at least one disclosed embodiment, the dispersion provides a coating for use in the protection of a surface relief structure. In another disclosed embodiment, the coating may itself form all or part of the surface relief structure. Exemplary transparent varnishes are, but are not limited to, nitrocellulose and cellulose acetyl butyrate.

In at least one disclosed embodiment, the surface relief structure is a diffractive optical surface structure. The surface structure may be printed or stamped or may be formed by any other method known in the art. Advantageously, the refractive index of the coatings is sufficiently greater than that of the surface structure, so as to preserve the diffractive effect of the diffractive optical surface structure. Exemplary diffractive optical surface structures that may benefit from the coating compositions herein disclosed include, but are not limited to, diffraction gratings, holograms and diffractive optical elements.

In yet another disclosed embodiment, the surface relief structure is a non-diffractive structure; examples of which are a sub wavelength structure, a lens, a microlens array or a waveguide.

It will be appreciated that the skilled artisan would be able to select a particular coating that matches the requirements of the surface relief structure in question. Optionally, the concentration of metal particles is sufficiently high so as to produce a refractive index shift, so that the optical effect of the surface relief structure is substantially unaffected or even enhanced.

In still another disclosed embodiment, the coating has a refractive index of greater than 1.0, optionally greater than 1.4, or greater than 1.7, or greater than 1.8.

Optionally, the primary crystallite size of the metal oxide particles is between 1 and 100 nm. The primary crystallite size of the metal oxide particles may be between 5 and 25 nm.

Advantageously, the coatings when utilized as an ink may be printed as is, without the requirement of a resin or carrier. When employed as a protective layer over a relief structure, the coatings herein disclosed offer high transparency and low colour and are resistant to mechanical lifting. The optical effect of the surface relief structure is maintained whilst removing relief, so that contact copying is not possible. As such, the visibility and brilliance of the relief structure is preserved. The coatings also provide high adhesion.

In at least one disclosed embodiment, the metal oxide is titanium oxide or zirconium oxide or mixtures thereof. A metal oxide may be titanium oxide.

In at least one disclosed embodiment, the metal oxide particles are coated with an inorganic and/or organic coating. An inorganic coating may be an oxide, non-limiting examples of which are alumina, silica and zirconia or mixtures thereof.

Non-limiting examples of organic coatings are polyols, esters, siloxanes, silanes, organosilicon compounds and carboxylic acids and mixtures thereof. An organic coating may be a fatty carboxylic acid.

In at least one disclosed embodiment, the coating or dispersion additionally comprises at least one dispersing aid. Optionally, the dispersing aid is a neutral, anionic or cationic polymer or copolymer. Exemplary dispersing aids include alkylolammonium salts of a polymer or copolymer, polyhydroxystearic acids and polycaprolactone polyols.

In at least one disclosed embodiment, the dispersing aid may comprise a hyperdispersant.

In at least one disclosed embodiment, the coating or dispersion additionally comprises at least one binder. Binders may be organic binders. Optionally, binders are organic polymers such as those based on ketone or aldehyde polymers.

In at least one disclosed embodiment, the metal oxide particles are doped with a further metal oxide.

Non-limiting examples of suitable organic solvents are ketones, esters, glycols and glycol ethers and mixtures thereof.

In yet another disclosed embodiment, the coating or dispersion may additionally comprise a radiation-curable resin, for example a resin which is curable by actinic radiation such as UV radiation, X-rays or electron beams.

The radiation-curable resin may be a transparent or translucent ink formed from a clear resin material. Such a transparent or translucent ink is particularly suitable for printing light-transmissive security elements such as numerical-type DOEs and lens structures.

In at least one disclosed embodiment, the transparent or translucent ink may comprise an acrylic-based, UV-curable, clear, embossable lacquer or coating.

Such UV-curable lacquers can be obtained from various manufacturers, including Kingfisher Ink Limited, product ultraviolet type UVF-203 or similar. Alternatively, the radiation-curable, embossable coatings may be based on other compounds, e.g. nitro-cellulose.

Still another disclosed embodiment provides a method of protecting a surface relief structure comprising the steps of providing a dispersion comprising metal oxide particles in an organic solvent, applying the dispersion to a surface relief structure, and removing the solvent so as to form a coating, wherein the coating has a refractive index greater than the refractive index of the surface relief structure. The surface relief structure may be printed or stamped or formed by any other method known in the art.

In yet another disclosed embodiment, the method further comprises the step of applying one or more coats of transparent varnish to the so-formed coating.

The transparent varnish may comprise one or more UV-curable components.

Additionally or alternatively, the dispersion may itself further comprise at least one transparent varnish. Additionally or alternatively, the dispersion may also further comprise one or more binders.

In a further disclosed embodiment, the dispersion may further comprise one or more radiation-curable resins, for example a resin which is curable by actinic radiation such as UV radiation, X-rays or electron beams. The radiation-curable resin may be a transparent or translucent ink formed from a clear resin material. In at least one disclosed embodiment, the transparent or translucent ink may comprise an acrylic-based, UV-curable, clear lacquer or coating.

In at least one disclosed embodiment, the surface relief structure is a diffractive optical surface structure.

In a further disclosed embodiment, the application of the dispersion to a surface or substrate may itself form all or part of the surface relief structure.

In yet another disclosed embodiment, the coatings or dispersions may find use as a printing ink, utilising any method of printing well known in the art. Advantageously, such coatings or dispersions may be utilised in reel-to-reel printing, obviating the need for high temperature sputtering.

Yet another disclosed embodiment provides the use of a coating or dispersion in the protection of surface relief structures. In at least one disclosed embodiment the surface relief structure is a diffractive optical surface structure.

In another disclosed embodiment, there is provided a security device including a surface relief structure and a coating in accordance with any one of the aforementioned embodiments.

Another disclosed embodiment provides a security device comprising a surface relief structure protected by a coating in accordance with any one of the aforementioned methods.

Yet another disclosed embodiment provides a security document or token including a security device in accordance with any one of the aforementioned embodiments.

For purposes of this disclosure, use of the terms 'comprises' or 'comprising' or grammatical variations thereon shall be taken to specify the presence of stated features, integers, steps or components but does not preclude the presence or addition of one or more other features, integers, steps, components or groups thereof not specifically mentioned.

Definitions

Security Document

As used herein, the term 'security document' includes all types of documents and tokens of value and identification documents including, but not limited to the following: items of currency such as banknotes and coins, credit cards, cheques, passports, identity cards, securities and share certificates, driver's licenses, deeds of title, travel documents such as airline and train tickets, entrance cards and tickets, birth, death and marriage certificates, and academic transcripts.

The disclosed embodiments are particularly, but not exclusively, applicable to security documents such as banknotes or identification documents such as identity cards or passports formed from a substrate to which one or more layers of printing are applied.

Substrate

As used herein, the term 'substrate' refers to the base material from which the security document or token is formed. The base material may be paper or other fibrous material such as cellulose; a plastic or polymeric material including but not limited to polypropylene (PP), polyethylene (PE), polycarbonate (PC), polyvinyl chloride (PVC), polyethylene terephthalate (PET); or a composite material of two or more materials, such as a laminate of paper and at least one plastic material, or of two or more polymeric materials.

Security Device or Feature

As used herein, the term 'security device or feature' includes any one of a large number of security devices, elements or features intended to protect the security document or token from counterfeiting, copying, alteration or tampering. Security devices or features may be provided in or on the substrate of the security document or in or on one or more layers applied to the base substrate, and may take a wide variety of forms, such as security threads embedded in layers of the security document; security inks such as fluorescent, luminescent and phosphorescent inks, metallic inks, iridescent inks, photochromic, thermochromic, hydrochromic or piezochromic inks; printed and embossed features, including relief structures; interference layers; liquid crystal devices; lenses and lenticular structures; optically variable devices (OVDs) such as diffractive devices including diffraction gratings, holograms and diffractive optical elements (DOEs).

Diffractive Optical Elements (DOEs)

As used herein, the term 'diffractive optical element' refers to a numerical-type diffractive optical element (DOE). Numerical-type diffractive optical elements (DOEs) rely on the mapping of complex data that reconstruct in the far field (or reconstruction plane) a two-dimensional intensity pattern. Thus, when substantially collimated light, e.g. from a point light source or a laser, is incident upon the DOE, an interference pattern is generated that produces a projected image in the reconstruction plane that is visible when a suitable viewing surface is located in the reconstruction plane, or when the DOE is viewed in transmission at the reconstruction plane. The transformation between the two planes can be approximated by a fast Fourier transform (FFT). Thus, complex data including amplitude and phase information has to be physically encoded in the microstructure of the DOE. This DOE data can be calculated by performing an inverse FFT transformation of the desired reconstruction (i.e. the desired intensity pattern in the far field).

DOEs are sometimes referred to as computer-generated holograms, but they differ from other types of holograms, such as rainbow holograms, Fresnel holograms and volume reflection holograms.

The disclosed embodiments and examples are illustrative only and should not be construed as limiting upon the scope of the invention. It will be understood that variations upon the disclosed embodiments as would be apparent to the skilled addressee are within the scope of the invention. Similarly, the disclosed embodiments are capable of finding application in areas that are not explicitly recited in this document and the fact that some applications are not specifically described should not be considered as a limitation on the overall applicability of the invention.

The coating or dispersion herein disclosed may be prepared by dispersing particles of a metal oxide in a suitable organic solvent. Optionally, the coating or dispersion comprises 1 to 60% by weight of metal oxide, or 2 to 40% by weight, or 2 to 20% by weight. A metal oxide may be titanium oxide.

The particle size of the metal oxide is important to producing high refractive index (HRI) coatings. Optionally, the primary crystallite size of the metal oxide is between 1 and 100 nm, or between 5 and 25 nm. It will be appreciated that the measured particle size may not reflect this primary crystallite size and will be dependent on the extent of particle surface treatment and on the presence or otherwise of additives that may influence primary crystallite agglomeration. Further, the skilled artisan will appreciate that different particle size measurement techniques may yield different results depending on the nature of the sample under analysis.

Metal oxides may be titanium oxide, zirconium oxide, zinc oxide, tin oxide and cerium oxide.

Any suitable organic solvent may be used to disperse the metal oxide. Organic solvents may be ketones, esters, glycols and glycol ethers and mixtures thereof.

The coating or dispersion herein disclosed may also comprise at least one binder material, optionally an organic binder material. Organic binder materials are materials that can function as a viscosity modifier, have film forming properties, can add mechanical strength to films or coatings that are formed therewith, or some combination thereof. Generally, the at least one organic binder has a minimal solubility in polar solvents, and/or high boiling point solvents. Generally, the at least one organic binder material is compatible with other solvents used to form the coating or dispersion. Also, the at least one organic binder is compatible with the dispersion so that a homogenous solution is created and maintained when combined with the dispersion.

In one disclosed embodiment, organic binder materials that are utilized include high molecular weight polymers. Exemplary materials include, but are not limited to polyethylene oxide (PEO), polyvinyl alcohol (PVA), or polyacrylic acid (PAA). In at least one disclosed embodiment, the organic binder is an alkyl cellulose ether. Examples of alkyl cellulose ethers include, but are not limited to methyl cellulose, hydroxypropyl methyl cellulose and derivatives of hydroxyethyl cellulose. In at least one disclosed embodiment, the at least one organic binder is present in the coating or dispersion from 0.5 to 20% by weight. In another disclosed embodiment, the at least one organic binder is present in the coating or dispersion from 0.5 to 15% by weight. In yet another disclosed embodiment the at least one organic binder is present in the coating or dispersion from 0.5 to 12% by weight.

The coating or dispersion herein disclosed may also comprise at least one dispersing aid.

In another disclosed embodiment, the at least one dispersing aid is present in the coating or dispersion from 1 to 15% by weight. In another disclosed embodiment, the at least one dispersing aid is present in the coating or dispersion from 2 to 10% by weight. In yet another disclosed embodiment the at least one dispersing aid is present in the coating or dispersion from 3 to 8% by weight. Optionally the dispersing aid is an anionic or cationic polymer or copolymer. A dispersing aid may be an alkylolammonium salt of a polymer or copolymer.

Coatings may comprise a dispersion of metal oxide and a transparent varnish. The transparent varnish may contain one or more UV-curable components. In at least one disclosed embodiment, the coating may be formed by printing as an ink and then the so-formed coating is itself coated with one or more coats of a transparent varnish. Again, the transparent varnish may contain one or more UV-curable components. In still another disclosed embodiment, mixtures of the dispersion with transparent varnish may be applied to a surface and the so-formed coating may optionally be followed by one or more layers of transparent varnish.

In some applications it is advantageous to apply more than one layer of varnish.

In terms of coating thickness, it will be appreciated that these can vary widely depending on the nature of the surface relief structure in question. Effective coatings may result utilising a metal oxide coating depth of about 10 to 1000 nm, optionally 50 to 700 nm. The varnish coating may be up to 10 micron in depth or even more.

In respect of providing an effective coating that offers resistance to counterfeiting by mechanical lifting, the whole of the surface relief structure may be filled by the coating, including any additional varnish coatings, so as to result in a flat surface.

Excellent coatings may result by mixing 1, 1.5 or 2 parts of a 10% by weight ink composition (10% metal oxide dispersed in an organic solvent) with 1 part transparent varnish. The mixture may be printed as is and the resulting coating may be treated with one or more further varnish overcoats.

Similarly, 1 or 2 parts of a 10% by weight ink composition in solvent with 1 or 2 parts varnish and 1 or 2 parts organic solvent may also be advantageously utilised.

Successfully performing coatings have also been prepared by mixing 1 part 40% by weight ink composition with 1-5 parts transparent varnish of mixing 1 part 40% by weight ink with 4 parts varnish and 2 parts organic solvent.

EXAMPLES

Metal Oxide Dispersion

Metal oxide dispersions were obtained from a variety of sources, namely MK Impex, Ontario, Canada; NanoGram Corporation, California, USA, Chem-Well Tech Co., Ltd, South Korea and Sumitomo Osaka Cement Co. Ltd., Japan. The coating or dispersion may additionally comprise a radiation-curable resin.

In one example, titanium dioxide nanoparticles (40-45% by weight) were dispersed in an organic solvent, typically dipropylene glycol monomethyl ether. The dispersions further comprised 11-13% by weight binder and 6-8% by weight dispersing aid.

To these dispersions were added methyl ethyl ketone (MEK) to dilute to a concentration of about 13% by weight (a 1:2 dispersion in MEK was found to be advantageous) by conventional mixing methods.

Optionally, one or more transparent varnishes and/or UV-curable resins may be added to the metal oxide dispersion prior to coating.

Method of Coating

The application of the coating may be performed using known commercial methods such as gravure printing, flexographic print, silk screen printing and the like.

In at least one disclosed embodiment, an in-line serial method occurs simultaneously with the process for producing the relief structures, that is, the high refractive index coating itself forms the relief structure.

Alternatively or additionally, the application of the coating may occur as a separate process to the production of the relief surface.

The methods allow for an economically effective process for application of the coating with printing speeds of up to and greater than 120 m/min This may be followed by further printing of one or more transparent varnish layers.

The invention claimed is:

1. A security device comprising:
a substrate; and
a single-layer transparent protective coating, wherein:
(i) the substrate has a surface relief structure, wherein:
said surface relief structure is filled by the single-layer transparent protective coating to give a physically flat surface and wherein said physically flat surface is absent any surface relief, and
wherein said single-layer transparent protective coating has a refractive index greater than a refractive index of the surface relief structure, or
(ii) the single-layer transparent protective coating forms all or part of a surface relief structure, wherein:
said surface relief structure of said single-layer transparent protective coating is filled by a layer of varnish to give a physically flat surface and wherein said physically flat surface is absent any surface relief, and
wherein said single-layer transparent protective coating has a refractive index greater than a refractive index of the layer of varnish,
wherein said single-layer transparent protective coating comprises a layer comprising particles of at least one metal oxide dispersed in a transparent varnish, wherein the particles have a primary crystallite size from 1 to 100 nm, and wherein said single-layer transparent protective coating is free of a high refractive index polymer, and
wherein the concentration of particles is sufficiently high in the single-layer transparent protective coating to increase the refractive index of the single-layer transparent protective coating such that, in the case of (i), the single-layer transparent protective coating maintains an optical effect of the substrate surface relief structure or, in the case of (ii), the layer of varnish maintains an optical effect of the single-layer transparent protective coating surface relief structure.

2. The device of claim 1, further comprising one or more radiation-curable resins.

3. The device of claim 2, wherein the radiation-curable resin is a UV-curable resin.

4. The device of claim 1, wherein the surface relief structure is a diffractive optical surface structure.

5. The device of claim 1, wherein the metal oxide is titanium oxide or zirconium oxide or mixtures thereof.

6. The device of claim 1, wherein the metal oxide particles are coated with an inorganic and/or organic coating.

7. The device of claim 1, further comprising at least one dispersing aid.

8. A security document or token including a security device according to claim 1.

9. The device of claim 1, wherein said single-layer transparent protective coating consists of a single layer comprising the particles of the at least one metal oxide dispersed in the transparent varnish.

10. A security device comprising:
a substrate; and
a single-layer transparent protective coating, wherein:
the substrate has a surface relief structure, wherein:
said surface relief structure is filled by the single-layer transparent protective coating to give a physically flat surface and wherein said physically flat surface is absent any surface relief, and
wherein said single-layer transparent protective coating has a refractive index greater than a refractive index of the surface relief structure,
wherein said single-layer transparent protective coating comprises a layer comprising particles of at least one metal oxide dispersed in a transparent varnish, wherein the particles have a primary crystallite size from 1 to 100 nm, and wherein said single-layer transparent protective coating is free of a high refractive index polymer, and
wherein the concentration of particles is sufficiently high in the single-layer transparent protective coating to increase the refractive index of the single-layer transparent protective coating such that the single-layer transparent protective coating maintains an optical effect of the substrate surface relief structure.

11. A security device comprising:
a substrate; and
a single-layer transparent protective coating, wherein:
the single-layer transparent protective coating forms all or part of a surface relief structure, wherein:
said surface relief structure of said single-layer transparent protective coating is filled by a layer of varnish to give a physically flat surface and wherein said physically flat surface is absent any surface relief, and
wherein said single-layer transparent protective coating has a refractive index greater than a refractive index of the layer of varnish,
wherein said single-layer transparent protective coating comprises a layer comprising particles of at least one metal oxide dispersed in a transparent varnish, wherein the particles have a primary crystallite size from 1 to 100 nm, and wherein said single-layer transparent protective coating is free of a high refractive index polymer, and
wherein the concentration of particles is sufficiently high in the single-layer transparent protective coating to increase the refractive index of the single-layer transparent protective coating such that the layer of varnish maintains an optical effect of the single-layer transparent protective coating surface relief structure.

\* \* \* \* \*